April 10, 1962  L. A. CADMUS  3,028,932
WHEEL AND BRAKE ASSEMBLY
Filed March 6, 1959  3 Sheets-Sheet 1

INVENTOR.
Lamont A. Cadmus.
BY
Harness, Dickey & Pierce.
ATTORNEYS.

April 10, 1962

L. A. CADMUS 3,028,932

WHEEL AND BRAKE ASSEMBLY

Filed March 6, 1959

INVENTOR.
Lamont A. Cadmus
BY Harness, Dickey & Pierce
ATTORNEYS.

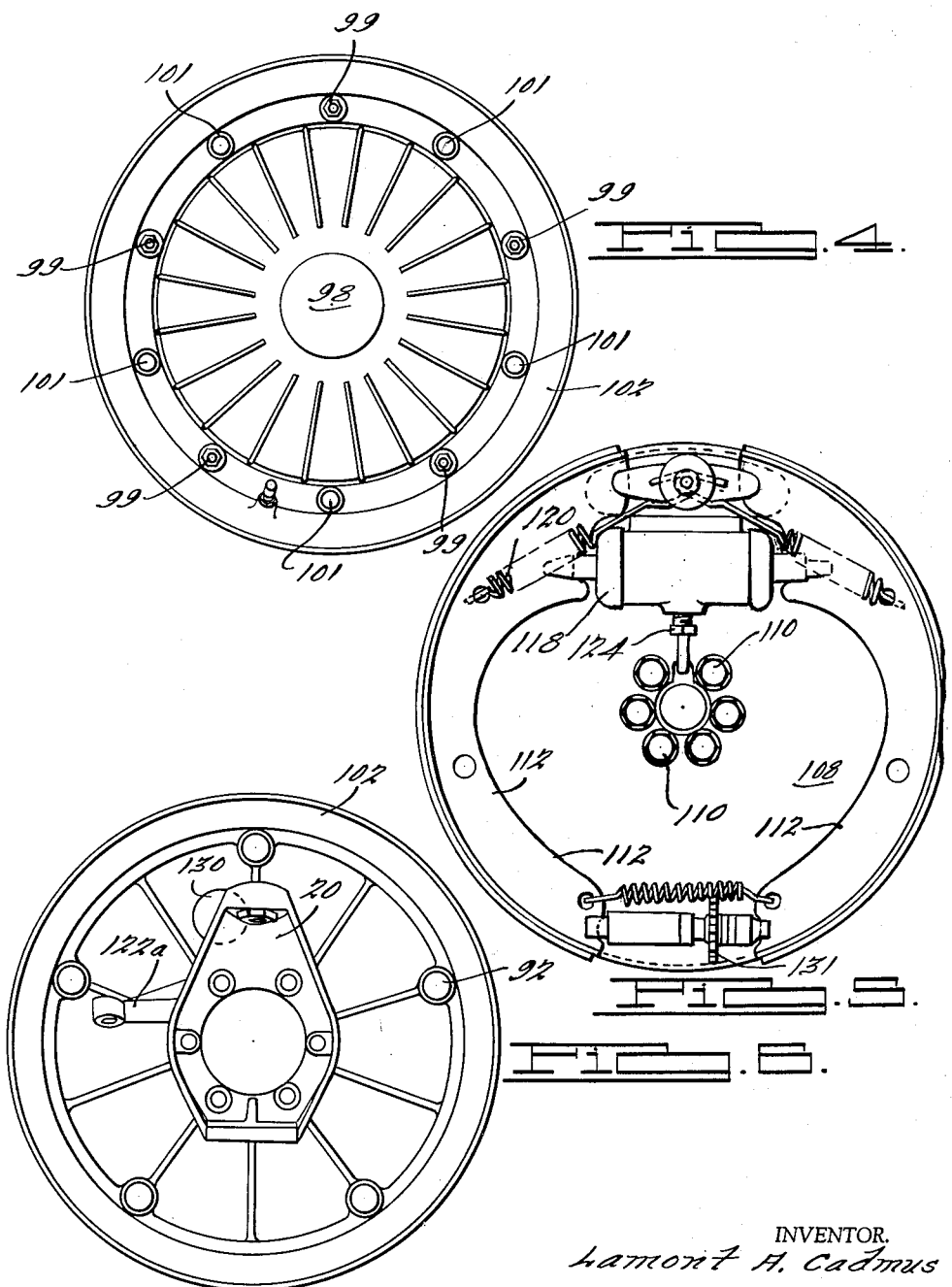

United States Patent Office 3,028,932
Patented Apr. 10, 1962

3,028,932
WHEEL AND BRAKE ASSEMBLY
Lamont A. Cadmus, Toledo, Ohio, assignor, by mesne assignments, to Bank of America National Trust and Savings Association, a national banking association
Filed Mar. 6, 1959, Ser. No. 797,607
2 Claims. (Cl. 188—2)

This invention relates generally to wheel and brake assemblies for motor vehicles and more particularly to a wheel and brake assembly in which the movable brake shoes are disposed in a sealed chamber located outwardly of the wheel to which the brake shoes are applied.

An object of this invention, therefore, is to provide an improved wheel and brake assembly of the above type which is particularly adapted for use in a driven wheel, which has the brake shoes and the operating structure therefor mounted on the outside of the wheel to facilitate access to the brakes for repair and servicing, is simple to construct and is readily assembled with a vehicle.

Further objects, features, and advantages of this invention will become apparent from a consideration of the following description, the appended claims, and the accompanying drawing in which:

FIG. 4 is a side view of the brake and wheel assembly of this invention looking at the outer side of the wheel;

FIG. 5 is a side view of the brake and wheel assembly shown in FIG. 4 with the brake drum removed; and FIG. 6 is a side view of the brake and wheel assembly of this invention looking at the inner side of the wheel.

Figure 1:
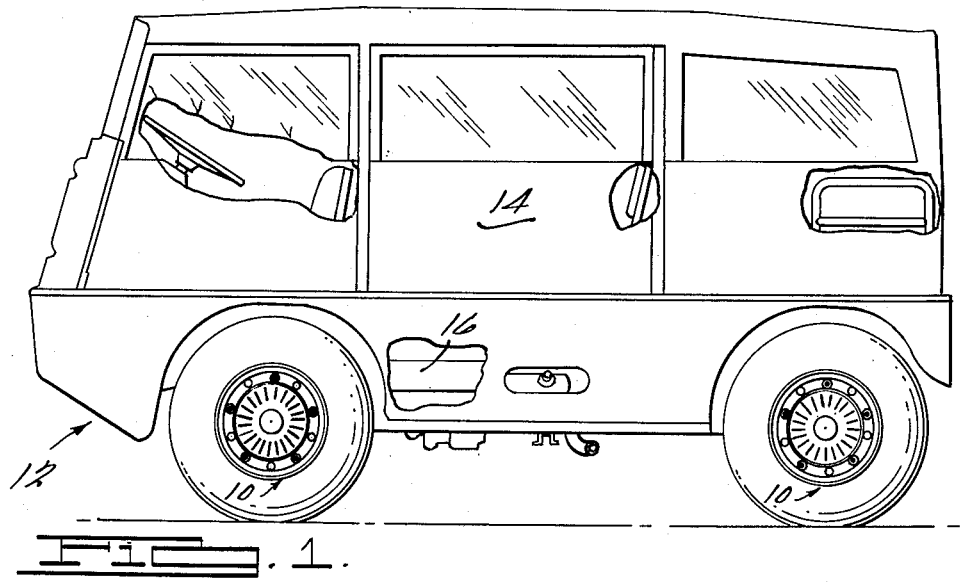
FIGURE 1 is a side elevational view of a vehicle of four-wheel drive type provided with the wheel and brake assembly of this invention.
Figure 2:
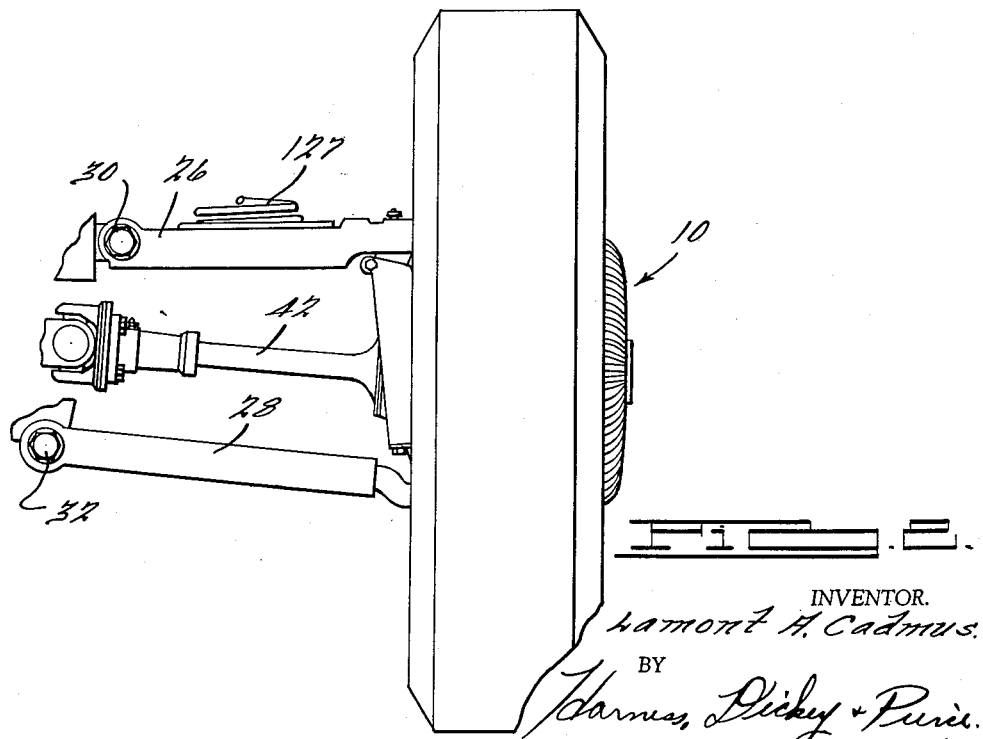
FIG. 2 is a fragmentary front view of a wheel and the suspension structure therefor in the vehicle of FIG. 1.

With reference to the drawing, the wheel and brake assembly of this invention, indicated generally at 10, is illustrated in FIG. 1 mounted on a vehicle 12 of the forward control four-wheel drive type. The vehicle 12 includes a body 14 mounted on a frame 16 which carries the four-vehicle wheel and brake assemblies 10, only two of which are shown.

An assembly 10 (FIG. 3) includes a tubular spindle housing 18 which is mounted on and extends outwardly of the vehicle from a bracket 20 which is attached to the outer ends of vertically spaced generally horizontal frame units 26 and 28 which are supported at their inner ends on pivots 30 and 32, respectively, carried by the frame 16. As used herein, the terms "outer end" and "outboard end" refer to that part of a member furthest from the center line of the vehicle 12 as contrasted with the "inner end" and the "inboard end" which are closer to the center line. A wheel spindle 34 extends axially through the spindle housing 18 and is provided with a splined outer end portion 36 for a purpose to appear presently. The spindle 34 is supported intermediate its ends on a ball bearing 38 carried by the spindle housing 18 and is connected at its inner end by a universal joint 40 to the outer end of a wheel drive shaft 42. The universal joint 40 is protected by a flexible boot 44 and the bearing 38 is protected from dirt and road dust by an annular seal unit 46 which extends about the spindle 34 and is disposed in a cavity 48 in the spindle housing 18 at a position adjacent the bearing 38.

The assembly 10 also includes a wheel member 50 having a central hub 52 and an annular body portion 54 which extends radially outwardly from the hub 52. The hub 52 is rotatably supported on a pair of bearings 55 and 56, of roller bearing type, which are supported on an intermediate portion 58 of the wheel spindle housing 18.

In the assembly of the wheel hub 52 and the bearings 55 and 56 with the spindle portion 58, an annular seal unit 60 is first positioned on the spindle 18 adjacent the inner end thereof and then the bearing 55 is moved on the portion 58 to a position in which it abuts a shoulder 64 on the spindle 18 located adjacent the seal unit 60. The wheel 50 is moved onto the bearing 55 to a position in which a central radially inwardly extending flange 66 on the hub 52 engages the bearing 55. The bearing 56 is then assembled on the spindle portion 58 to a position against the flange 66 followed by mounting of an annular retainer ring 70 on the spindle housing 18 at a position extending about an O-ring 72. The sleeve 70 has a reduced inner end portion which supports an annular seal 68, like the seal 60, which seals the outer end of the space between the hub 52 and the spindle portion 58. The inner end of this space is sealed by the seal member 60.

Figure 3:
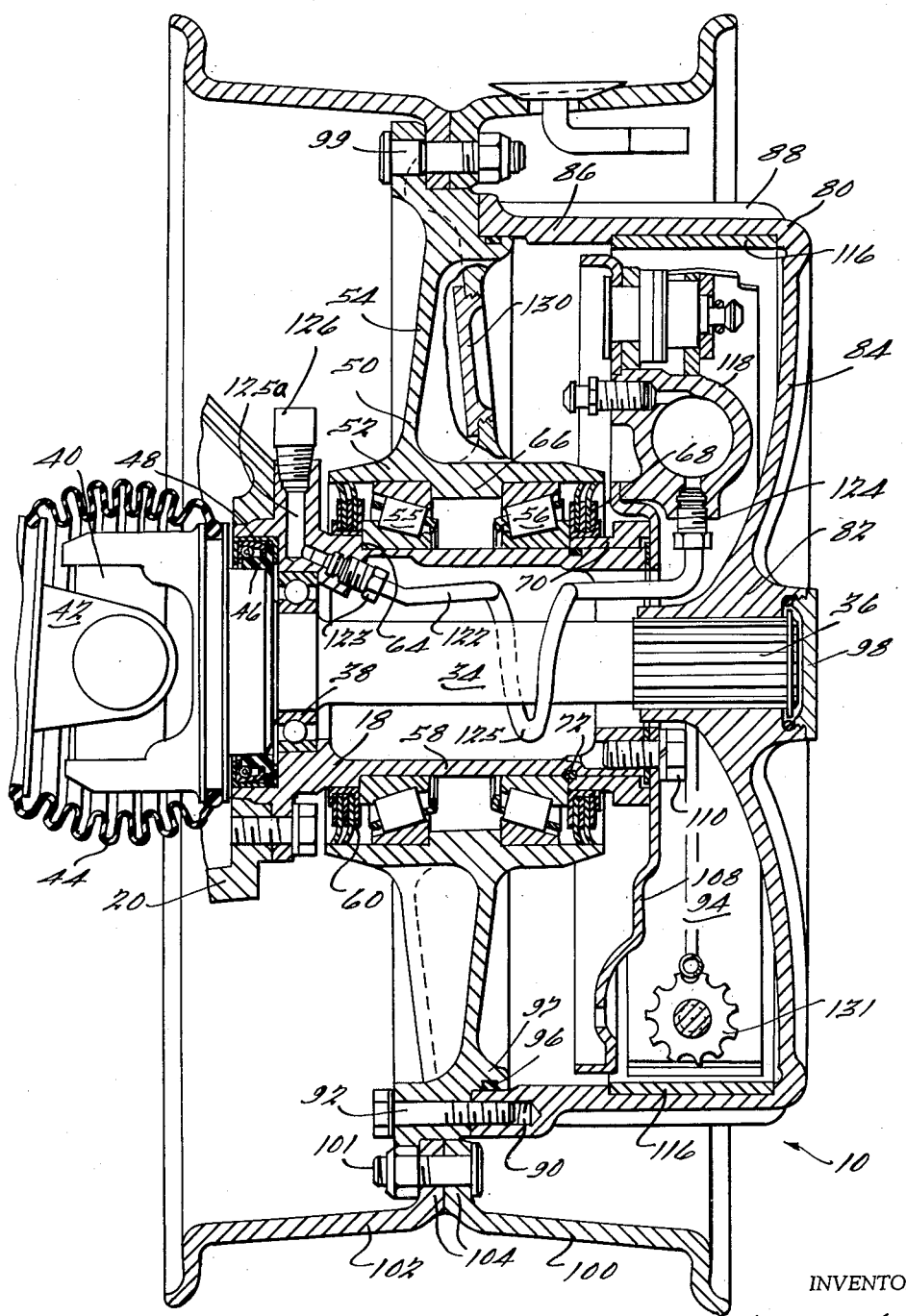
FIG. 3 is a vertical sectional view of the wheel and brake assembly of this invention.

A brake drum member 80 has a central hub 82 which is splined and is inserted on the splined portion 36 of the spindle 34. The drum member 80 also includes a body portion 84 which extends radially outwardly from the hub 82 and terminates in an inwardly extending flange 86 formed on its outer side with heat radiating fins 88. The inner edge of the flange 86 is of a diameter to fit about an annular flange 97 on the wheel 50 and is provided with a plurality of tapped holes 90 which receive bolts 92 that are extended through the wheel 50 to mount the drum 80 on the wheel 50. As shown in FIG. 3, the drum member 80 is of a shape such that it cooperates with the wheel body portion 54 and the spindle housing 18 to form an annular space or chamber 94 which extends about the spindle housing 18 and the spindle 34. This chamber 94 is sealed by the seals 60 and 68 previously described, an O-ring 96 positioned between the drum flange 86 and the cooperating wheel flange 97, and a cap 98 threaded on the hub 82 so as to cover the outer end of the spindle 34.

Bolts 99 connect a pair of wheel rim members 100 and 102 to the wheel body portion 54 and alternate with bolts 101 which extend through inwardly extending flanges 104 on the rim members 100 and 102 so as to connect the rim members.

An upright backing plate 108 (FIGS. 3 and 5) is secured by bolts 110 to the outer end of the spindle housing 18 and projects radially outwardly into the chamber 94. A pair of brake shoes 112 are movable mounted on the backing plate 108 for outward movement into engagement with brake lining material 116 carried by the brake drum rim 86. The shoes 112 are moved outwardly in response to actuation of a hydraulic motor mechanism 118, of conventional type, mounted on the backing plate 108 at a position between the upper ends of the brake shoes 112. Return spring assemblies 120 insure return of the brake shoes 112 to their inoperative positions spaced from the lining material 116 when the supply of fluid under pressure to the motor mechanism 118 is discontinued. A bendable fluid supply line 122, formed of a substantially rigid metal or plastic material, extends through the spindle housing 18 and delivers fluid under pressure to the motor mechanism 118. A fitting 123 connects the inner end of line 122 to a conduit 125a formed in the inboard end of spindle housing 18 and connected through a line 126 to a supply of fluid under pressure. A fitting 124 at the opposite end of line 122 connects the line to the motor mechanism 118. Intermediate its ends, the line 122 is formed in the shape of a loop 125 which extends about the spindle 34. The line 122 is formed of this shape to facilitate the connection of its ends, as shown without requiring strict tolerances on the length of the line 122.

In the use of a wheel and brake assembly 10, power is supplied to the shaft 42 which rotates the spindle 34 to in turn rotate the brake drum 80. Since the drum 80 is secured to the wheel 50, by the bolts 92, the wheel is likewise driven. Steering of the wheel 50 is accomplished through a steering arm 122a secured to the bracket 20 and connected to the usual steering linkage (not shown). The brakes are applied by supplying fluid under pressure to the motor mechanism 118 so as to move the brake shoes 112 outwardly into engagement with the lining 116 carried by the brake drum rim 86. A spring 127, supported on the top arm unit 26 engages the vehicle body for cushioning the body movements in response to up and down movement of the assembly 10.

From the above description, it is seen that this invention provides a wheel and brake assembly in which the surfaces of the brake shoes 112 and the brake drum 80 which contact each other are located in the sealed chamber 94. Consequently, the brake lining material 116 will have a longer service life because it is not subjected to the action of dirt and other foreign material. The location and arrangement of the seals 60, 68, 72 and 96 insures an effective sealing of the chamber 94. The brakes are readily accessible for repair and servicing because they are on the outside of the wheel 50 instead of being on the inside, as is the usual case, and are on the outboard side of the backing plate 108. A removable door 130 in the body portion 54 of the wheel 50 provides direct access to the brake parts since it can be located at a position in substantial horizontal alignment with the motor mechanism 118 and can be rotated to a position in horizontal alignment with the star wheel 131 which is operable to adjust the brake shoes 112. To remove the wheel rim parts 100 and 102 for repair of the tire associated therewith, it is only necessary to remove the nuts on the five bolts 99.

It is to be understood that the specific construction of the improved wheel and brake assembly which is herein disclosed and described is presented for purposes of explanation and illustration and is not intended to indicate limits of the invention, the scope of which is defined by the following claims.

What is claimed is:

1. In a wheel assembly for a motor vehicle which includes a nonrotatable spindle housing, a spindle member extending axially through said housing, a wheel member rotatably disposed on said spindle housing and having an axially outwardly extending annular flange portion, a brake drum having an annular flange extending axially inwardly toward said wheel member and having a radially facing surface on said annular flange matably peripherally disposed about a confronting radially facing surface on said annular flange portion of said wheel member and having a hub releasably connected to said spindle for rotation therewith, means connecting said flange on said brake drum to said wheel member to provide for rotation of said wheel member in response to rotation of said brake drum, said brake drum being of a shape to form with said wheel member and said spindle housing a closed annular chamber located on the outer side of said wheel member, sealing means for sealing said chamber disposed between pairs of a plurality of members comprising said wheel member, said spindle housing, said spindle, and said brake drum and including an elastic sealing member annularly disposed between said radially facing surfaces on said flange of said brake drum and on said flange portion of said wheel member, and braking means mounted on said spindle housing and extending into said chamber for selective engagement with said brake drum.

2. In a wheel assembly for a motor vehicle which includes a nonrotatable spindle housing, a spindle member extending axially through said housing, a wheel member rotatably disposed on said spindle housing and having an axially outwardly extending annular flange portion, a brake drum having an annular flange extending axially inwardly toward said wheel member and having a radially facing surface on said annular flange matably peripherally disposed about a confronting radially facing surface on said annular flange portion of said wheel member and having a hub releasably connected to said spindle for rotation therewith, means connecting said flange on said brake drum to said wheel member to provide for rotation of said wheel member in response to rotation of said brake drum, said brake drum being of a shape to form with said wheel member and said spindle housing a closed annular chamber located on the outer side of said wheel member, sealing means for sealing said chamber disposed between pairs of a plurality of members comprising said wheel member, said spindle housing, said spindle, and said brake drum and including an elastic O-ring annularly disposed between said radially facing surfaces on said flange of said brake drum and on said flange portion of said wheel member, and braking means mounted on said spindle housing and extending into said chamber for selective engagement with said brake drum.

References Cited in the file of this patent

UNITED STATES PATENTS

| | | |
|---|---|---|
| 2,160,271 | Kliesrath | May 30, 1939 |
| 2,317,906 | Garnett et al. | Apr. 27, 1943 |
| 2,386,477 | Kraft | Oct. 9, 1945 |
| 2,649,922 | Hutchinson et al. | Aug. 25, 1953 |
| 2,734,600 | Strickland | Feb. 14, 1956 |
| 2,859,839 | Throne et al. | Nov. 11, 1958 |

FOREIGN PATENTS

| | | |
|---|---|---|
| 613,340 | Great Britain | Nov. 25, 1948 |